United States Patent [19]
Ciambrone

[11] 3,942,020
[45] Mar. 2, 1976

[54] CORONA DISCHARGE OZONE GENERATOR

[75] Inventor: David F. Ciambrone, Santee, Calif.

[73] Assignee: Cubic Corporation, San Diego, Calif.

[22] Filed: Dec. 9, 1974

[21] Appl. No.: 530,933

[52] U.S. Cl............................ 250/539; 250/536
[51] Int. Cl.² ............................................. C01B 13/11
[58] Field of Search............................ 250/539, 540

[56] References Cited
UNITED STATES PATENTS

| 882,509 | 3/1908 | Wood | 250/539 |
|---|---|---|---|
| 919,445 | 4/1909 | Lohman | 250/540 |
| 1,403,025 | 1/1922 | Haase | 250/539 |
| 1,845,670 | 2/1932 | Lebrun | 250/539 |
| 2,906,686 | 9/1959 | Trüb | 250/539 X |

*Primary Examiner*—John H. Mack
*Assistant Examiner*—Aaron Weisstuch
*Attorney, Agent, or Firm*—Brown & Martin

[57] ABSTRACT

The generator incorporates plural tubular outer electrodes retained within a cylindrical pipe housing. The inner electrode is a metal strip with a helical twist. It is spaced from the outer electrode by a cylindrical dielectric. Circular plates are utilized for supporting and spacing the electrode tubes, and for manifolding gases to the electrode and making electrical contact with the inner electrodes. The circular plates also act as terminals for electrically connecting the electrodes across the source of high voltage.

4 Claims, 5 Drawing Figures

CORONA DISCHARGE OZONE GENERATOR

BACKGROUND OF THE INVENTION

Ozone generators have been utilized for many years in scientific and purification operations. Ozone is typically generated by an electrical spark discharge or by high intensity ultra-violet lighting. Spark discharge apparatus is not adaptable to continuous operations and therefore they have not found wide spread usage outside of the scientific application.

Ultra-violet ozone generators have been found to be suitable for some purposes. However, the lamps must be regularly replaced and the apparatus housing the ultra-violet lamps must provide access to the lamps for such replacement. The lamps are relatively fragile and bulky requiring a large housing and mounting to protect them and to provide for the flow of air there around. In consequence, ultra-violet ozone generators are excessively expensive for some applications.

It has also been proposed that ozone be generated by corona discharge. However, no practical device has been developed whereby the corona discharge process can be utilized in an economically practical system.

Therefore, it is desirable to have a corona discharge ozone generator that is simple in construction and produces a moderate concentration of ozone in a continuous operation. Such a device is particularly desirable where it may be efficiently assembled and where it is sturdy and maintenance free in use.

SUMMARY OF THE INVENTION

The invention is described in its use as an ozone generator using air as the working gas. However, the invention is equally applicable to exposing any gas to a corona discharge.

An exemplary embodiment of the invention utilizes a plurality of tubes on parallel axes mounted within an elongated pipe housing. The tubes are of a conductive metal and form the outer electrode for an axial flow electrode system. The center or inner electrode is formed by a metal strip twisted into the form of a helix to increase its rigidity and to produce a flow distribution that maximizes ozone generation. The inner electrode is spaced from the outer electrode by a dielectric in the form of a cylinder. The inner electrode is terminated short of the terminus of the dielectric at one end but extends beyond the dielectric and is connected to an electrical terminal at the opposite end. The outer electrodes are spaced and supported within the pipe housing by two or more support plates. The plates have holes with inner diameters that correspond to the outer diameter of the outer electrode. The outer electrodes are received in the holes so that the plates space and support the outer electrodes within the interior of the pipe housing. A similar plate with an identical pattern of holes is utilized as an end plate and electrode terminal. By a relative rotation of the plate the holes are brought into a partial registry with the openings of the ends of the dielectric cylinders thereby permitting air flowing in the pipes housing to enter the dielectric cylinders and flow therealong. An end screen positions the dielectric cylinders at the opposite or second end of the dielectric cylinders. The inner electrode terminates on the terminal plate and is secured thereto. A pair of snap rings are utilized to position the electrode assembly within the pipe housing by frictional engagement with the walls of the pipe housing and an abutting relationship with the terminal plate at a first end of the device and with the end screen at the opposite or second end of the electrode assembly.

It is therefore an object of the invention to provide a new and improved corona discharge ozone generator.

It is another object of the invention to provide a new and improved corona discharge ozone generator which is low in manufacturing cost.

It is another object of the invention to provide a new and improved corona discharge ozone generator which minimizes the assembly labor requirement.

It is another object of the invention to provide a new and improved corona discharge ozone generator that efficiently produces a medium concentration of ozone.

It is another object of the invention to provide a new and improved corona discharge ozone generator that is rugged in construction.

It is another object of the invention to provide a new and improved corona discharge ozone generator which is susceptible to continuous operation.

It is another object of the invention to provide a new and improved corona discharge ozone generator with uniform ozone generation along the length of the device.

It is another object of the invention to provide a new and improved corona discharge ozone generator that requires little maintenance in service.

Other objects and many attendant advantages of the invention will become more apparent upon a reading of the following detailed description together with the drawings, in which like reference numerals refer to like parts throughout and in which.

Figure 1:
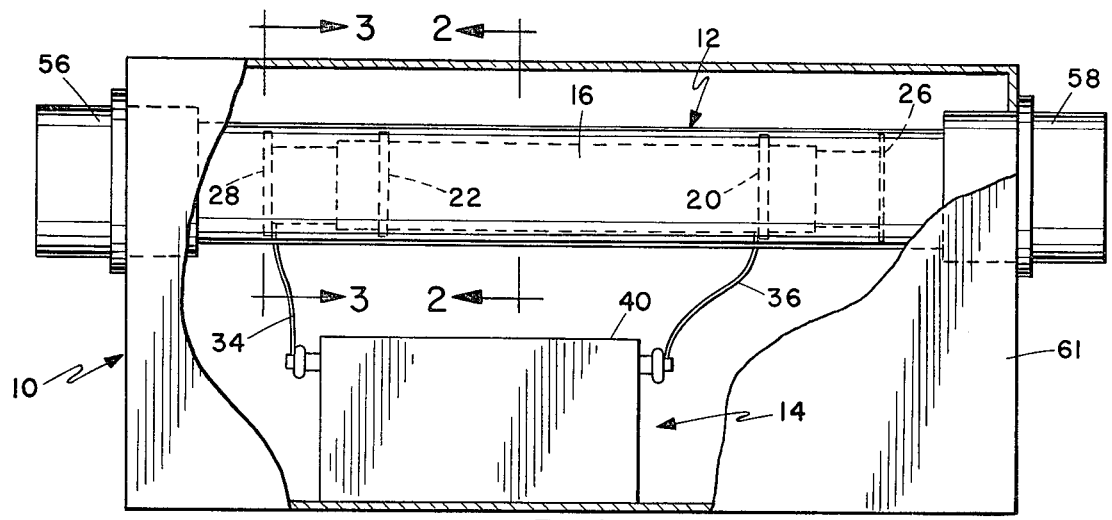
FIG. 1 is a side elevational view partially cut away, of the ozone generator.
Figure 2:
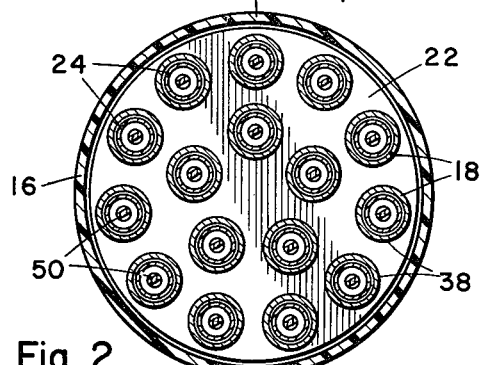
FIG. 2 is an enlarged sectional view taken on line 2—2 of FIG. 1.

Referring now to the drawings, there is illustrated an ozone generator unit 10 including a generator assembly 12 and a high voltage power supply 14. The generator assembly 12 is comprised of a pipe housing 16 which acts as a frame for the generator components and as a conduit for the process air.

In the exemplary embodiment the ground electrode is arranged as the outer electrode 18 in the form of an elongated tube. A plurality of the electrodes 18 are carried in circular support plates 20 and 22 which have a plurality of circular openings sized to receive the outer electrode tube.

Figure 3:
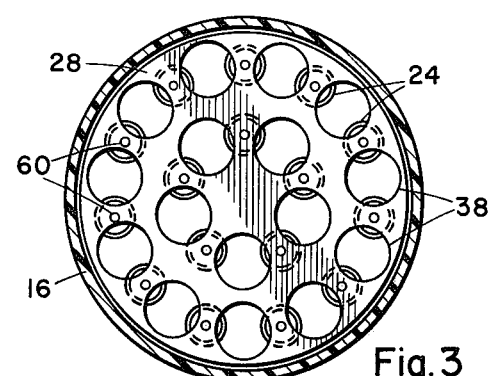
FIG. 3 is an enlarged sectional view taken on line 3—3 of FIG. 1.

The pipe housing 16 may be advantageously of PVC material which is essentially nonconducting. The circular support plates 20 and 22 may advantageously be of conductive material such as aluminum, and accordingly may be utilized as terminals for the connection between the source of high voltage 14 and the outer electrode 18. A third circular plate, end plate 28, has the same configuration as the circular support plates 20 and 22 including the same pattern of holes 38 (see FIG. 3). However, the end plate 28 includes a plurality of perforations into which are received the terminal portions 60 of inner electrodes 50. The full functions of end plate 28 will be described more fully hereinafter.

A quartz or boron silicate glass dielectric cylinder 24 is received within each of the outer electrodes 18 acting in conjunction with the ambient air for the purpose of forming a dielectric. The structural rigidity of the electrodes 50 is enhanced by a longitudinal twist forming a helix from a flat strip. The increased rigidity of inner electrode 50 permits the inner electrode to be spaced from the dielectric cylinders 24 and outer electrode 28 and also regularizes and distributes the charge and the resulting generation of ozone.

At the second or discharge end of the device an end plate 26 in the form of a circular screen butts against the terminal portions of the dielectric cylinders 24 to hold the cylinders 24 in position. The inner electrode 50 terminates short of the end of the cylinders 24 and is held out of contact with the end plate 26. The assembly is completed by snap rings 30 and 32 which frictionally engage the interior walls of the pipe and butt against the end plates 26 and 28. Additional structural security may be obtained by adhesively securing the snap rings 30 and 32 in place.

Figure 4:
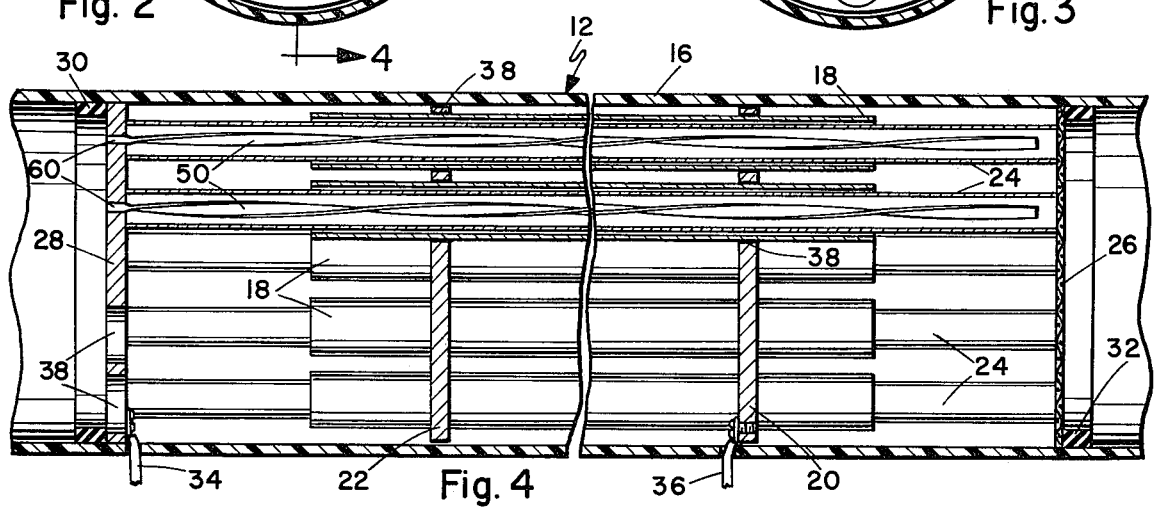
FIG. 4 is a sectional view taken on line 4—4 of FIG. 2.

The end plate 28, in addition to maintaining the structural integrity of the apparatus by holding the dielectric cylinders 24 in position, serves as a manifold to direct the air flow through the dielectric cylinders 24 and outer electrodes 18. The manifolding effect is accomplished utilizing the same blank utilized for the circular support plate 20 and 22 by a rotational displacement of the plate to orientate the holes 38 in a manner that exposes the interior of the dielectric cylinders 24. Air flowing from the left in FIG. 4 enters the dielectric cylinders 24 and flows along their length, exiting through the screen 26. Auxiliary penetrations through the end plate 28 receive the terminal portions of the inner electrodes 50 so that the end plate may serve as a terminal for the connection from the source of high voltage. Thus, the source of high voltage is connected across the inner and outer electrodes by wires 34 and 36 being connected to the end plate 28 and support plate 20 respectively.

Figure 5:
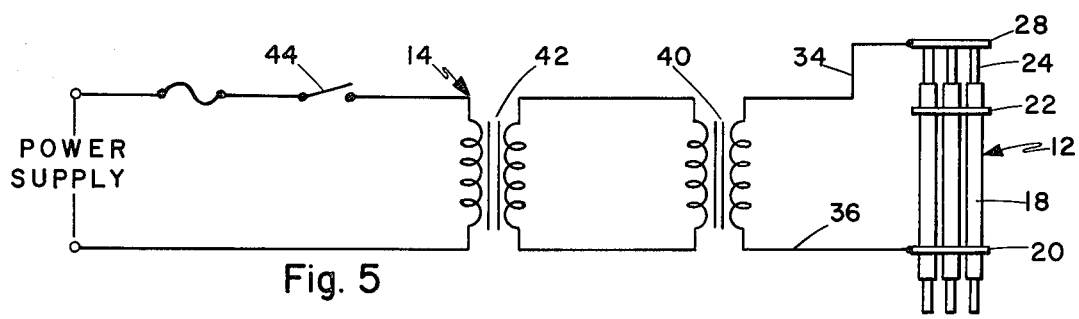
FIG. 5 is a wiring diagram of the ozone generator high voltage supply.

Referring now to FIG. 5, the schematic diagram of the high voltage power supply 14 is illustrated. The switch 44 regulates the power to a powerstat 42 whereby the voltage delivered to the high voltage transformer 40 may be varied. Accordingly, the powerstat regulates the output voltage of the high voltage transformer 40. Thus the proper voltage for a blue corona discharge may be selected. The output of the high voltage transformer 40 is connected via the wires 34 and 36 across the electrodes of the generator assembly 12. The generator assembly 12 and high voltage power supply 14 may be contained within a generally rectangular case 61 with fittings 56 and 58 adapting the pipe housing 16 to the appropriate supply and delivery conduits.

It will be understood that the device may be easily assembled by first inserting the outer electrodes 18 into support plates 20 and 22 and then inserting the cylindrical dielectrics 24 and inner electrodes 50. The device may then be inserted into the pipe housing 16. The end plates 26 and 28 are positioned and held in place by the snap rings 30 and 32. Where additional structural integrity is required it may be desirable to weld the terminal portions 60 of the inner electrodes 50 to the end plate 28, to tack weld the support plates 20 and 22 to the outer electrodes, and to adhesively band the snap rings 30 and 32 in position. Electrical connections are then made to the support plate 20 and end plate 28 and the device is ready for connection to the high voltage power supply 14 and subsequent operation.

Having described my invention, I now claim:

1. A corona discharge ozone generator comprising:
    a frame comprising an elongated cylindrical pipe housing,
    a plurality of outer electrodes comprising elongated tubes and supported on said frame,
    a plurality of inner electrodes comprising elongated elements received within said elongated tubes coaxial with said elongated tubes and spaced said elongated tubes,
    flow means for conveying gas between and along said inner and outer electrodes,
    said outer electrodes and said inner electrodes including electrical terminal means for electrical connection across a source of high voltage,
    at least one circular support plate having an outer diameter substantially equal to the inner diameter of said pipe housing,
    a plurality of spaced holes in said support plate,
    said outer electrodes being received through said holes and being supported from said support plate,
    said support plate forming said electrical terminal means for electrically connecting said outer electrode to the source of high voltage,
    said flow means for conveying gas between and along said inner and outer electrodes comprising an elongated cylindrical dielectric element interposed between said inner and outer electrodes,
    said dielectric element extending axially beyond the ends of said outer electrodes,
    said inner electrodes terminating at a first end thereof beyond the end of said dielectric elements and at a second end thereof terminating short of said dielectric elements,
    a first circular end plate abutting said first ends of said dielectric element and being electrically connected to said inner electrodes,
    said first circular plate including a pattern of holes corresponding to the relative spacing of said outer electrodes but being rotationally displaced therefrom to comprise openings for admitting gas to said electrodes, and
    said electrodes are received within said first circular end plate.

2. A corona discharge ozone generator according to claim 1, wherein:
    said outer electrodes are supported in said pipe by at least two axially spaced support plates.

3. A corona discharge ozone generator according to claim 1, wherein:
    a second circular end plate abuts said second ends of said dielectric elements and is perforated to permit pneumatic communication between said pipe and said electrodes.

4. A corona discharge ozone generator according to claim 1, wherein:
    said inner electrode comprises a strip of conductive material twisted in a helical configuration having a plurality of turns along the length of said inner electrode.

* * * * *